(12) United States Patent
Guan

(10) Patent No.: US 11,366,665 B2
(45) Date of Patent: Jun. 21, 2022

(54) MICROPROCESSOR WITH HIGH-EFFICIENCY DECODING OF COMPLEX INSTRUCTIONS

(71) Applicant: Shanghai Zhaoxin Semiconductor Co., Ltd., Shanghai (CN)

(72) Inventor: Yingbing Guan, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 48 days.

(21) Appl. No.: 16/984,339

(22) Filed: Aug. 4, 2020

(65) Prior Publication Data
US 2021/0389947 A1  Dec. 16, 2021

(30) Foreign Application Priority Data

Jun. 15, 2020   (CN) .......................... 202010541910.6

(51) Int. Cl.
*G06F 9/30*   (2018.01)
*G06F 9/54*   (2006.01)
*G06F 9/38*   (2018.01)

(52) U.S. Cl.
CPC ...... *G06F 9/30145* (2013.01); *G06F 9/30069* (2013.01); *G06F 9/30098* (2013.01); *G06F 9/3881* (2013.01); *G06F 9/3895* (2013.01); *G06F 9/546* (2013.01)

(58) Field of Classification Search
CPC ............. G06F 9/30014; G06F 9/30018; G06F 9/30032; G06F 9/30109; G06F 9/30145; G06F 9/3877
See application file for complete search history.

(56) References Cited

U.S. PATENT DOCUMENTS

| | | | | |
|---|---|---|---|---|
| 5,075,844 A | * | 12/1991 | Jardine | G06F 9/3861 |
| | | | | 712/218 |
| 6,360,317 B1 | * | 3/2002 | Mahalingaiah | G06F 9/30167 |
| | | | | 712/233 |
| 6,901,505 B2 | * | 5/2005 | McGralh | G06F 9/30032 |
| | | | | 712/225 |
| 9,348,587 B2 | * | 5/2016 | Vorbach | G06F 9/3855 |
| 2008/0016323 A1 | * | 1/2008 | Henry | G06F 9/267 |
| | | | | 712/208 |
| 2016/0092227 A1 | * | 3/2016 | Patel | G06F 9/30145 |
| | | | | 712/208 |
| 2019/0079769 A1 | * | 3/2019 | Vorbach | G06F 9/3001 |

* cited by examiner

*Primary Examiner* — Corey S Faherty
(74) *Attorney, Agent, or Firm* — McClure, Qualey & Rodack, LLP

(57) ABSTRACT

Microcode combination of complex instructions is shown. A microprocessor includes an instruction queue, an instruction decoder, and a microcode controller. The instruction decoder is coupled to the instruction queue. The microcode controller is coupled to the instruction decoder and has a memory. The memory stores a combined microcode for M complex instructions arranged in a specific order, where M is an integer greater than 1. When the M complex instructions in the specific order have popped out of the first to M-th entries of the instruction queue, the instruction decoder operates the microcode controller to read the memory for the combined microcode with microcode reading trapping happened just once.

18 Claims, 6 Drawing Sheets

MICROPROCESSOR WITH HIGH-EFFICIENCY DECODING OF COMPLEX INSTRUCTIONS

CROSS REFERENCE TO RELATED APPLICATIONS

This Application also claims priority of China Patent Application No. 202010541910.6, filed on Jun. 15, 2020, the entirety of which is incorporated by reference herein.

BACKGROUND OF THE INVENTION

Field of the Invention

The present invention is related in general to microprocessor architecture, and in particular it is related to complex instruction decoding.

Description of the Related Art

Microprocessors usually use read-only memory (ROM) to store microcode for complex instructions, with a view to reducing decoder hardware costs. However, accessing the read-only memory still has a certain cost in terms of time, such as being trapped in microcode reading. How to efficiently deal with the delay caused by microcode reading trapping of complex instructions is an important issue in the technical field.

BRIEF SUMMARY OF THE INVENTION

Microcode combination of complex instructions is shown, which combines a plurality of complex instructions into one combined microcode and stores the combined microcode in a memory of a microcode controller. Instead of being trapped into reading microcode several times, the combined microcode is read from the memory with microcode reading trapping happened just once. This greatly improves the efficiency of the microprocessor.

A microprocessor in accordance with an exemplary embodiment of the present invention includes an instruction queue, an instruction decoder, and a microcode controller. The instruction decoder is coupled to the instruction queue. The microcode controller is coupled to the instruction decoder, and has a memory. The memory stores a combined microcode for M complex instructions which are arranged in a specific order, and M is an integer greater than 1. When the M complex instructions in the specific order pop out of the first to M-th entries of the instruction queue, the instruction decoder operates the microcode controller to read the memory for the combined microcode with microcode reading trapping happened just once.

In an exemplary embodiment, the microprocessor further has a detection circuit. When detecting that the first to the M-th entries pop out the M complex instructions in the specific order, the detection circuit outputs an instruction skip signal to the instruction queue. According to the instruction skip signal, with the exception of the first complex instruction passed to the instruction decoder, the second to M-th complex instructions are deleted from the instruction queue.

In an exemplary embodiment, the microprocessor further has a trapping generator. When detecting that the first to the M-th entries pop out the M complex instructions in the specific order, the detection circuit outputs a type information signal to instruct the trapping generator to operate the microcode controller and, accordingly, the microcode controller reads the combined microcode from the memory with microcode reading trapping happened just once.

In an exemplary embodiment, the memory stores a first combined microcode and a second combined microcode. The first combined microcode code corresponds to a first complex instruction and a second complex instruction. The second combined microcode code corresponds to the second complex instruction and a third complex instruction. When the first complex instruction and the second complex instruction have respectively popped out of a first entry and a second entry of the instruction queue, the instruction decoder operates the microcode controller to read the memory for the first combined microcode with microcode reading trapping happened just once. When the second complex instruction and the third complex instruction have respectively popped out of the first entry and the second entry of the instruction queue, the instruction decoder operates the microcode controller to read the memory for the second combined microcode with microcode reading trapping happened just once.

In an exemplary embodiment, the first complex instruction is a system call instruction of a system call procedure, the second complex instruction is a register swapping instruction of the system call procedure, and the third complex instruction is a system return instruction of the system call procedure. The system call procedure starts in response to the system call instruction and the register swapping instruction, which are successively arranged. The system call procedure ends in response to the register swapping instruction and the system return instruction, which are successively arranged.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

The following lists a variety of microprocessor architectures in which complex instructions are decoded at low cost and efficiently.

Figure 1:
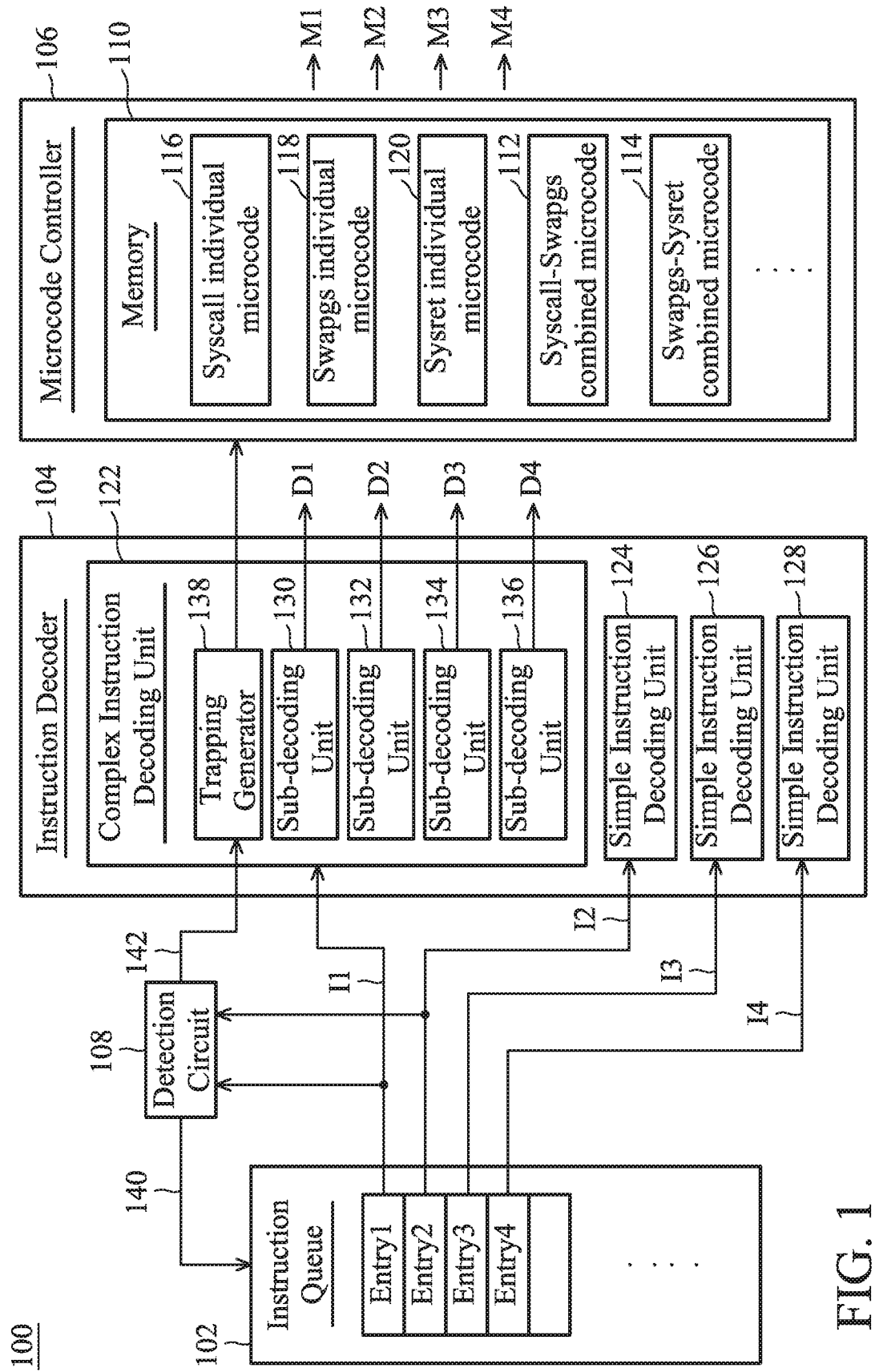
FIG. 1 depicts a microprocessor 100 in accordance with an exemplary embodiment of the present invention.

FIG. 1 depicts a microprocessor 100 in accordance with an exemplary embodiment of the present invention, which includes an instruction queue 102, an instruction decoder 104, a microcode controller 106, and a detection circuit 108. The instruction decoder 104 is coupled to the instruction queue 102. The microcode controller 106 is coupled to the instruction decoder 104 and has a memory 110. The memory 110 may be a read-only memory (ROM), in which multiple pieces of microcode are burned-in corresponding to a set of complex instructions.

In addition to the individual microcode of each complex instruction, a microcode combination technology for a plurality of complex instructions is proposed in the present invention. In an exemplary embodiment, the microcode bodies of a plurality of complex instructions are combined into a combined microcode and programmed into the memory 110 of the microcode controller 106. The combined microcode is read in response to the decoding of the plurality of complex instructions. With conventional technology, microcode reading trapping is repeated several times to decode the plurality of complex instructions. The cumulative delay is considerable. In the present invention, the combined microcode is read from the memory 110 with microcode reading trapping happened just once. This greatly improves the performance of the microprocessor 100.

The following exemplary embodiments specifically discuss three complex instructions involved in a system call procedure (for example, calling the system stack from the user stack), including: a system call instruction Syscall; a register swapping instruction Swapgs; and a system return instruction Sysret. The register swapping instruction Swapgs is generally used to protect the stack pointers of the user stack or the system stack. By sequentially executing the system call instruction Syscall and the register swapping instruction Swapgs, "Syscall+Swapgs", the system call procedure starts. By sequentially executing the register swapping instruction Swapgs and the system return instruction Sysret, "Swapgs+Sysret", the system call program ends. In the operation of the microprocessor 100, the "Syscall+Swapgs" and "Swapgs+Sysret" instruction sequences are quite common, whose microcode is preferably combined together.

As shown, a Syscall-Swapgs combined microcode corresponding to the "Syscall+Swapgs" instruction sequence and a Swaps-Sysret combined microcode 114 corresponding to the "Swapgs+Sysret" instruction sequence are burned in the memory 110. Although a combined microcode corresponds to a plurality of complex instructions, microcode reading trapping happens only one time, and the time latency is effectively reduced. Although the memory 110 still stores the Syscall individual microcode 116 for the system call instruction Syscall, the Swapgs individual microcode 118 for the register swapping instruction Swaps, and the Sysret individual microcode 120 for the system return instruction Sysret, they are accessed when instructions Syscall, Swapgs and Sysret are not arranged as the "Syscall+Swapgs" nor the "Swapgs+Sysret" instruction sequence.

Figure 2:
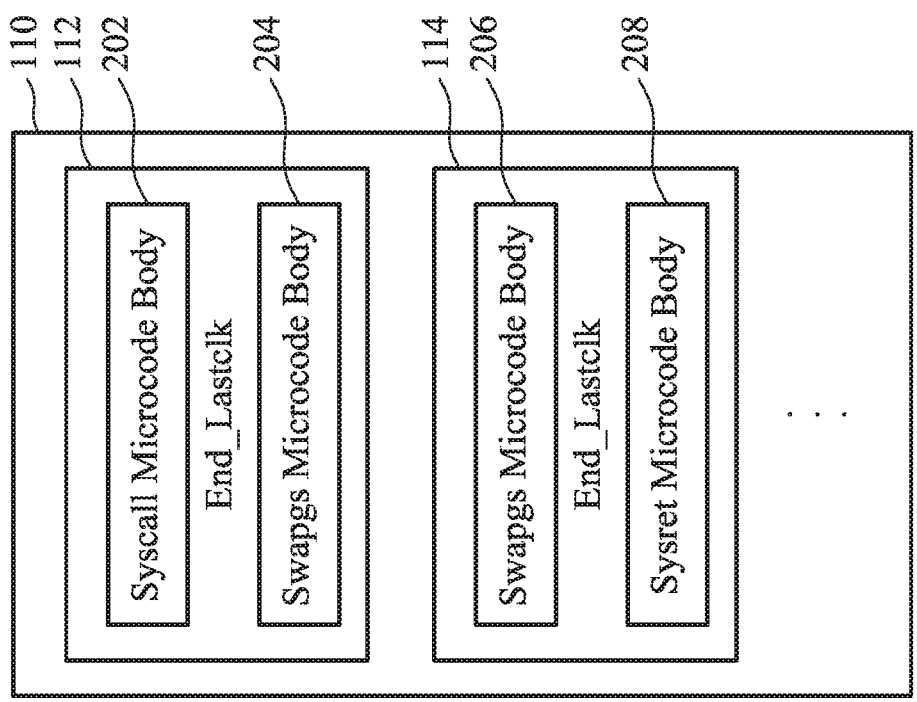
FIG. 2 illustrates the structure of the Syscall-Swapgs combined microcode 112 and the Swapgs-Sysret combined microcode 114.

FIG. 2 illustrates the structure of the Syscall-Swapgs combined microcode 112 and the Swapgs-Sysret combined microcode 114. In the Syscall-Swapgs combined microcode 112, the Syscall microcode body 202 and the Swapgs microcode body 204 are separated by a boundary microinstruction End_Lastclk. In the Swapgs-Sysret combined microcode 114, the Swapgs microcode body 206 and the Sysret microcode body 208 are separated by another boundary microinstruction End_Lastclk. A boundary microinstruction End_Lastclk is provided to deal with an interrupt request happened during the execution of the microinstructions prior to the boundary microinstruction End_Lastclk.

Referring back to FIG. 1, the hardware operations are recited below.

The pipeline width of the microprocessor 100 is 4. The instruction decoder 104 includes a complex instruction decoding unit 122 and three simple instruction decoding units 124, 126, and 128. The complex instruction decoding unit 122 includes four sub-decoding units 130, 132, 134, and 136, and a trapping generator 138. The complex instruction decoding unit 122 receives an instruction I1 that has popped out of the first entry Entry1 of the instruction queue 102. The simple instruction decoding units 124, 126, and 128 respectively receive instructions I2, I3, and I4 that pop out of the second, third, and fourth entries Entry2, Entry3, and Entry4 of the instruction queue 102. The detection circuit 108 detects whether the instructions I1 and I2 form the "Syscall+Swapgs" or "Swapgs+Sysret" instruction sequence. If yes, a decoding process for such a specific instruction sequence is performed.

When detecting that the instructions I1 and I2 form the "Syscall+Swapgs" or the "Swapgs+Sysret" instruction sequence, the detection circuit 108 provides an instruction skip signal 140 to the instruction queue 102, so that the popped instruction I2 (e.g., the register swapping instruction Swapgs or the system return instruction Sysret) does not enter the first entry Entry1, and is deleted from the instruction queue 102. In this way, the status of the instruction queue 102 does combine the decoding of the "Syscall+Swapgs" instruction sequence (or the "Swapgs+Sysret" instruction sequence). The instruction I1 is handed over to the sub-decoding unit 130, 132, 134, and 136 of the complex instruction decoding unit 122 to be decoded to the first four microinstructions D1, D2, D3, and D4 of the instructions I1 and I2. The remaining microinstructions of the instructions I1 and I2 are obtained from the combined microcode read from the memory 110. As shown, the detection circuit 108 outputs a type information signal 142 to instruct the trapping generator 138 to operate the microcode controller 106 to read the memory 110 for the combined microcode indicated by the type information signal 142. The system is trapped into the microcode reading just once rather than twice.

In an exemplary embodiment, when the instructions I1 and I2 form the "Syscall+Swapgs" instruction sequence, the complex instruction decoding unit 122 receives the system call instruction Syscall, and the first four microinstructions D1-D4 of the system call instruction Syscall are decoded from the sub-decoding units 130, 132, 134, and 136. The detection circuit 108 outputs "01" as the type information signal 142, which means that the "Syscall+Swapgs" instruction sequence is detected. In response to the type information signal 142 that is "01", the trapping generator 138 operates the microcode controller 106 to read the "Syscall+Swapgs" combined microcode 112 from the memory 110 with microcode reading trapping happened just once. The remaining microinstructions of the "Syscall+Swapgs" instruction sequence are obtained from the "Syscall-Swapgs" combined microcode 112, which are output as the microinstructions M1~M4 in the following cycles. By executing the microinstructions D1~D4 output in the first cycle and the multiple sets of microinstructions M1~M4 output in the successive cycles, the user stack starts the system call procedure.

In an exemplary embodiment, when the instructions I1 and I2 form the "Swapgs+Sysret" instruction sequence, the complex instruction decoding unit 122 receives the register swapping instruction Swapgs, and the first four microinstructions D1-D4 of the register swapping instruction Swapgs are decoded from the sub-decoding units 130, 132, 134, and 136. The detection circuit 108 outputs "11" as the type information signal 142, which means that the "Swapgs+Sysret" instruction sequence is detected. In response to the type information signal 142 that is "11", the trapping generator 138 operates the microcode controller 106 to read the "Swapgs+Sysret" combined microcode 114 from the memory 110 with microcode reading trapping happened just once. The remaining microinstructions of the "Swapgs+Sysret" instruction sequence are obtained from the "Swapgs+Sysret" combined microcode 114, which are output as the microinstructions M1~M4 in the following cycles. By executing the microinstructions D1~D4 output in the first cycle and the multiple sets of microinstructions M1~M4 output in the successive cycles, the user stack ends the system call procedure.

Figure 3:
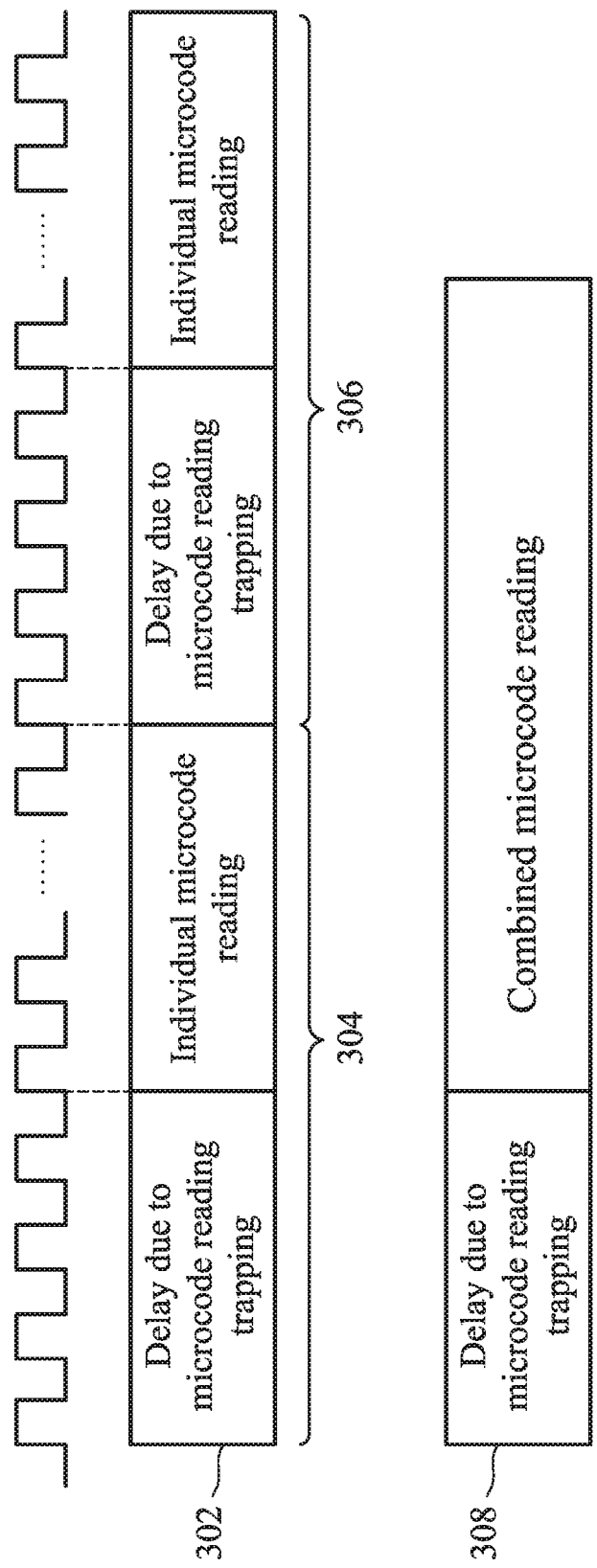
FIG. 3 is a timing chart illustrating the difference between conventional technology and the present invention.

FIG. 3 is a timing chart illustrating the difference between conventional technology and the present invention. According to conventional technology, the microcode reading timing 302 shows that the system is trapped into the microcode reading twice (reference numerals 304 and 306), and it must face two delay intervals. According to the present invention, the microcode reading timing 308 relates to the reading of a combined microcode (for example, the "Syscall-Swapgs" combined microcode 112 or the "Swapgs-Sysret" combined microcode 114). The system is trapped into microcode reading just once, which only results in a single delay interval. This significantly improves the performance of the microprocessor 100.

It is not intended to limit the number of complex instructions to be combined together. A combined microcode may correspond to M complex instructions which are arranged in a specific order. M is an integer greater than 1. Regardless of how many complex instructions are combined together, the combined microcode is read from a memory with microcode reading trapping happened just once. Furthermore, it is not intended to limit the width of the microprocessor pipeline. The width of the microprocessor pipeline is an integer n.

Figure 4:
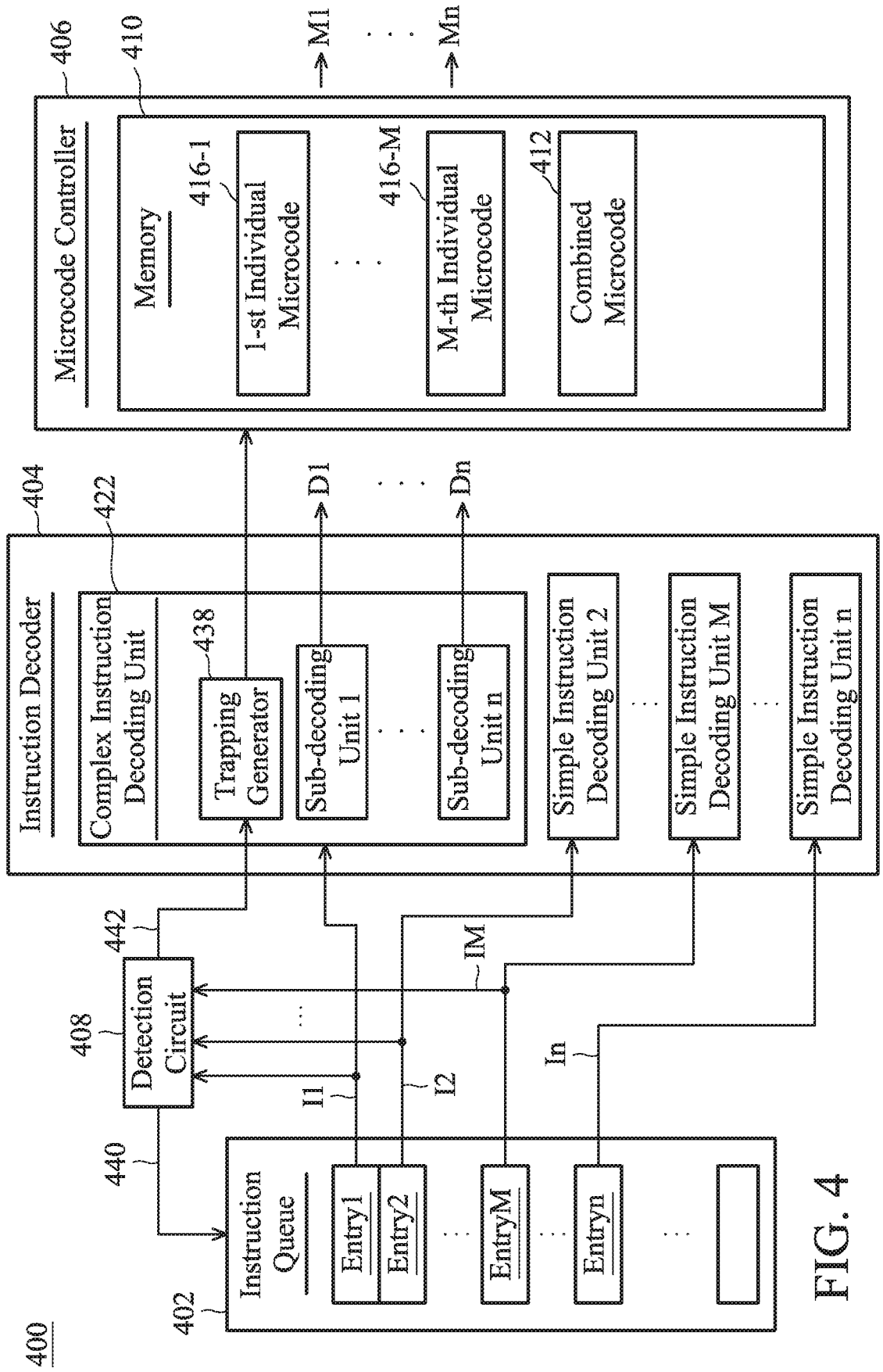
FIG. 4 illustrates a microprocessor 400 in accordance with an exemplary embodiment of the present invention.

FIG. 4 illustrates a microprocessor 400 in accordance with an exemplary embodiment of the present invention, which includes an instruction queue 402, an instruction decoder 404, and a microcode controller 406. The instruction decoder 404 is coupled to the instruction queue 402. The microcode controller 406 is coupled to the instruction decoder 404 and has a memory 410. The memory 410 stores a combined microcode 412 of M complex instructions which are arranged in a specific order, where M is an integer greater than 1. If the first to the M-th entries Entry1 to Entry M of the instruction queue 402 queue the M complex instructions in the specific order and then pop them out (referring to the instructions I1 to IM), the microcode controller 406 operates according to the instruction decoder 404 to read the combined microcode 412 from the memory 410 with microcode reading trapping happened just once. The memory 410 further stores individual microcode for each of the M complex instructions. Each individual microcode corresponds to one single trap of microcode reading. When the instructions I1 to IM are not the M complex instructions arranged in the specific order, the microcode controller 406 reads the memory 410 to answer any of the M complex instructions by the corresponding individual microcode (selected from the individual microcode 416_1 to the individual microcode 416_M).

The detection circuit 408 detects whether the instructions I1 to IM that have popped out of the first to the M-th entries Entry1 to Entry M of the instruction queue 402 are the M complex instructions arranged in the specific order. If yes, the detection circuit 408 outputs an instruction skip signal 440 to the instruction queue 402. Expect the first complex instruction transmitted to the instruction decoder 404, the second to the M-th popped-out complex instructions are deleted from the instruction queue 402 according to the instruction skip signal 440.

The instruction decoder 404 includes a complex instruction decoding unit 422 coupled to the first entry Entry1 of the instruction queue 402. When the instructions I1 to IM that have popped out of the first to the M-th entries Entry1 to Entry M are the M complex instructions arranged in the specific order, the complex instruction decoding unit 422 decodes the first n microinstructions (D1 to Dn). The remaining microinstructions of the M complex instructions are obtained from the combined microcode 412 that the microcode controller 406 reads from the memory 410 with microcode reading trapping happened just once, and are output as the microinstructions M1~Mn in the following cycles.

The complex instruction decoding unit 422 further includes a trapping generator 438. When the instructions I1 to IM that have popped out of the first to the M-th entries Entry1 to EntryM are the M complex instructions arranged in the specific order, the detection circuit 408 outputs a type information signal 442 to the trap generator 438 to operate the microcode controller 406 to read the combined microcode 412 from the memory 410 with microcode reading trapping happened just once.

Any case that generates a combined microcode for a plurality of complex instructions is within the technical scope of the present invention. Instead of being trapped into microcode reading several times, the reading of the combined microcode only traps the system once.

In some exemplary embodiments, there may be more than one complex instruction decoding unit. An instruction decoder may include a plurality of complex instruction decoding units.

The following further introduces another microprocessor architecture, in which the hardware bit length of the complex instruction decoder is expanded. The decoding of the complex instructions is high efficiency.

Figure 5:
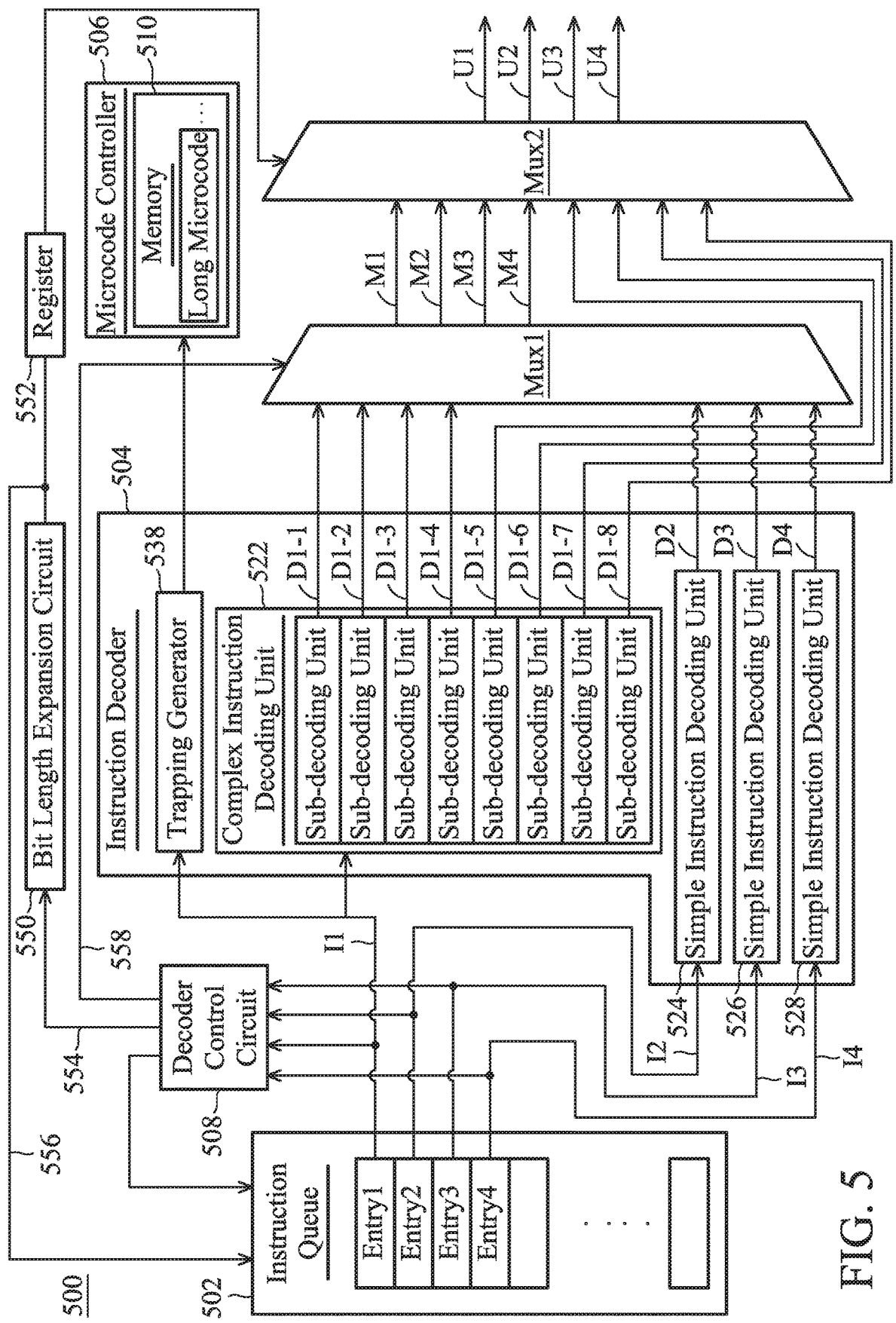
FIG. 5 depicts a microprocessor 500 in accordance with an exemplary embodiment of the present invention.

FIG. 5 depicts a microprocessor 500 in accordance with an exemplary embodiment of the present invention, which includes an instruction queue 502, and an instruction decoder 504. The instruction decoder 504 is coupled to the instruction queue 502 and includes a complex instruction decoding unit 522. The pipeline width of the microprocessor 500 is 4. The complex instruction decoding unit 522 includes 8 sub-decoding units, twice the pipeline width (4) of the microprocessor 500. In this architecture, a short complex instruction with 8 or less microinstructions can be quickly handled by the hardware of the complex instruction decoding unit 522. The microprocessor 500 further includes a microcode controller 506. The microcode controller 506 includes a memory 510, which is a microcode storage device for long complex instructions. Each long complex instruction includes more than 8 microinstructions. The system is trapped into reading microcode from the memory 510 only for long complex instructions.

As shown, the instruction decoder 504 further includes a trap generator 538. According to the type of the instruction I1, the trap generator 538 decides whether the microcode reading on the memory 510 is required. When the instruction I1 is a long complex instruction including more than 8 microinstructions, the trap generator 538 operates the microcode controller 506 to read the corresponding microcode from the memory 510, and the system is trapped into the microcode reading. When the instruction I1 is a short complex instruction or a simple instruction whose number of microinstructions does not exceed 8, the trap generator 538 does not operate the microcode controller 506 to read the memory 510 and the system is not trapped into microcode reading.

Referring to the 8 sub-decoding units in FIG. 5, every 4 sub-decoding units form a group, and the different groups operate in the different cycles. For example, the first four sub-decoding units output four microinstructions D1-1 . . . D1-4 in the first cycle, and the following four sub-decoding units output four microinstructions D1-5 . . . D1-8 in the second cycle. Because the complex instruction decoding unit 522 has such an expanded bit length, the microprocessor 500 includes hardware such as a decoder control circuit 508 (also called a pair circuit, or a detection circuit), a bit length expansion circuit 550, a register 552, and two multiplexers Mux1 and Mux2.

When the instruction I1 that has popped out of the first entry Entry1 of the instruction queue 502 is a complex instruction, the decoder control circuit 508 determines the number of microinstructions of the complex instruction I1, and outputs a signal 554 to inform the bit length expansion circuit 550 of the number of microinstructions of the complex instruction I1. When the signal 554 shows that the number of microinstructions of the complex instruction I1 is greater than 4 and not more than 8, the bit length expansion circuit 550 outputs a pause signal 556 to the instruction queue 502 to suspend the instruction queue 502 popping out instructions until the decoding of the complex instruction I1 is completed by the complex instruction decoding unit 522.

In an exemplary embodiment in which the instruction I1 is a complex instruction involving eight microinstructions, the complex instruction decoding unit 522 operates the first four sub-decoding units to generate four microinstructions D1-1 . . . D1-4 in the first cycle, and operates the next four sub-decoding units to generate four microinstructions D1-5 . . . D1-8 in the second cycle. The hardware decoding of the instruction I1 takes two cycles. Thus, the bit length expansion circuit 550 uses the pause signal 556 to stop the instruction queue 502 in the second cycle from instruction popping. The complex instruction decoding unit 522 uses two cycles to decode the complex instruction I1 to output two sections of microinstructions (D1-1 . . . D1-4 in the first cycle, and D1-5 . . . D1-8 in the second cycle). The complex instruction decoding unit 522 is not allowed to decode the next instruction until the third cycle.

Through the multiplexers Mux1 and Mux2, the microinstructions decoded from the hardware of the instruction decoder 504 are output as micro-instructions U1 to U4.

This paragraph discusses the exemplary embodiment that the instruction I1 is a complex instruction including eight microinstructions. In the first cycle, the microinstructions D1-1 to D1-4 decoded by the first to fourth sub-decoding units of the complex instruction decoding unit 522 are selected by the multiplexer Mux1 and input the multiplexer Mux2 to be output as the microinstructions U1 to U4. In the second cycle, the microinstructions D1-5 to D1-8 decoded from the fifth to the eighth sub-decoding units of the complex instruction decoding unit 522 are output by the multiplexer Mux2 as the microinstructions U1 to U4. Bit length expansion is successfully achieved by the complex instruction decoding unit 522.

As shown, the instruction decoder 504 further includes three simple instruction decoding units 524, 526, and 528.

When the four instructions I1 to I4 that have popped out of the first to fourth entries Entry1 to Entry4 of the instruction queue 502 are simple instructions, the first sub-decoding unit of the complex instruction decoding unit 522 and the three simple instructions decoding units 524, 526, and 528 operate in the same cycle to output four microinstructions D1-1, D2, D3, and D4. The multiplexer Mux1 outputs the four microinstructions D1-1, D2, D3, and D4 as the microinstructions M1 to M4 which are input the multiplexer Mux2, and the multiplexer Mux2 outputs the microinstructions M1 to M4 as the microinstructions U1 to U4. The microprocessor 500 can also fully cope with the decoding of simple instructions. The microprocessor 500 can also handle other examples in which the consecutive instructions are not all simple instructions. In an exemplary embodiment in which only the instructions I1 and I2 are simple instructions and the remaining instructions I3 and I4 are complex instructions, the first sub-decoding unit of the complex instruction decoding unit 522 and the first simple instruction decoding unit 524 operate in the same cycle to output two microinstructions D1-1 and D2 as the microinstructions M1 and M2 which are input the multiplexer Mux2. The multiplexer Mux2 outputs the microinstructions M1 and M2 as the microinstructions U1 and U2.

Referring to FIG. 5, the multiplexer Mux1 is controlled by the decoder control circuit 508 through a signal 558. The decoder control circuit 508 will recognize the types of the instructions I1 to I4 (complex or simple instructions), and outputs the signal 558 to control the multiplexer Mux1.

The multiplexer Mux2 is operated according to a value stored in the register 552. The register 552 is filled in by the bit length expansion circuit 550. The register 552 is initially set to a first value. When the first value is stored in the register 552, the multiplexer Mux2 outputs microinstructions M1 to M4 as microinstructions U1 to U4. When the instruction I1 popped output from the first entry Entry1 is a complex instruction, and the number of microinstructions of the complex instruction I1 is greater than 4 and not more than 8, the bit expansion decoding control circuit 550 changes the register 552 to the second value in the second cycle following the first cycle. Based on the register 552 storing the second value, the multiplexer Mux2 outputs the microinstructions D1-5 . . . D1-8 as the microinstructions U1 to U4.

By hardware expansion of the complex instruction decoding unit 522, the microprocessor 500 with the limited bit length (e.g., 128 bits) can efficiently decode instructions even though the complex instructions queued in the instruction queue 502 are in a long bit length of 256 bits. When a long-bit-length operation is divided into short-bit-length operations (e.g., one 256-bit operation is divided into two 128-bit operations), the number of microinstructions may be doubled. By the complex instruction decoding unit 522 with the expanded bit length, the doubled microinstructions are successfully decoded from hardware without trapping the system into reading microcode from the memory 510.

In an exemplary embodiment, the hardware bit length is limited to only 128 bits. A 256-bit operation involves two 128-bit microinstructions for memory accessing, two 128-bit microinstructions for calculations, and two 128-bit microinstructions for result storage. The number of microinstructions is doubled from three to six. However, the complex instruction decoding unit 522 with hardware expansion in this case has the decoding ability of up to eight microinstructions. Therefore, the system is not trapped into reading microcode from the memory 510.

In other exemplary embodiments, the pipeline width is not limited to 4, and may be any integer n. Furthermore, the bit length expansion of the complex instruction decoding unit is not limited to twice the pipeline width. The complex instruction decoding unit may have k sub-decoding units, where k is greater than n and is an integer multiple of n. Multiple multiplexers may be combined together to deal with the wider bit length expansion.

Figure 6:
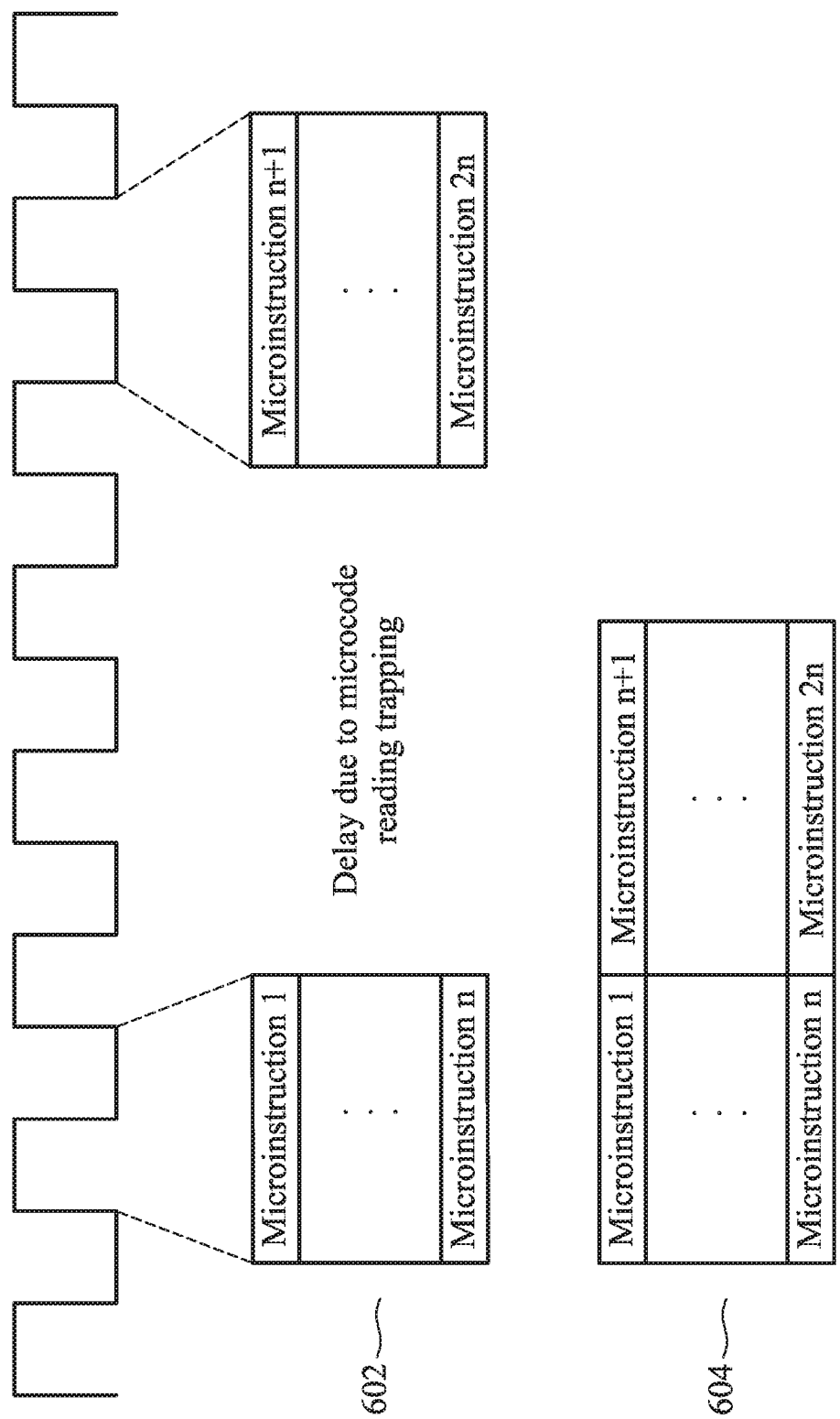
FIG. 6 is a timing chart, which shows the difference between conventional technology and the present invention.

FIG. 6 is a timing chart, which shows the difference between conventional technology and the present invention. In this example, the decoding capability for complex instruction is up to 2n microinstructions, twice the pipeline width n.

The timing diagram 602 corresponds to a conventional complex instruction decoding unit without hardware expansion, and it is difficult to prevent the system from being trapped into microcode reading. When the first to the n-th microinstructions are decoded from the hardware in one cycle, the remaining microinstructions, e.g., the (n+1)-th to the 2n-th microinstructions, are read from a memory, which results in microcode reading trapping.

Referring to an exemplary embodiment of the present invention, the timing diagram 604 corresponds to a complex instruction decoding unit with hardware expansion, and there is no microcode reading trapping. After the first to the n-th microinstructions are decoded from the hardware in one cycle, the remaining microinstructions, e.g., the (n+1)-th to the 2n-th microinstructions, are decoded from the hardware in the next cycle. Microcode reading trapping is perfectly prevented.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A microprocessor, comprising:
an instruction queue;
an instruction decoder, coupled to the instruction queue; and
a microcode controller, coupled to the instruction decoder, and having a memory, wherein the memory stores a plurality of individual microcode segments, the memory also stores a combined microcode segment for a sequence of M complex instructions, which are arranged in a specific order, and M is an integer greater than 1;
wherein:
when the sequence of M complex instructions in the specific order are respectively received from first to M-th entries of the instruction queue, a first n microinstructions of the M complex instructions are decoded by the instruction decoder, and the instruction decoder controls the microcode controller to read remaining microinstructions of the M complex instructions from the combined microcode segment of the memory, where n is a number representing a pipeline width.

2. The microprocessor as claimed in claim 1, wherein:
the combined microcode segment includes at least one boundary microinstruction that separates microcode bodies, corresponding to the sequence of M complex instructions, in the combined microcode; and
the boundary microinstruction is provided to deal with an interrupt request happened during execution of microinstructions prior to the boundary microinstruction.

3. The microprocessor as claimed in claim 1, wherein:
the memory further stores individual microcode segments for each of the M complex instructions; and
when the sequence of M complex instructions in the specific order are respectively received from the first to M-th entries of the instruction queue, the instruction decoder operates the microcode controller to read the memory for the combined microcode segment rather than reading the individual microcode segment of each of the M complex instructions.

4. The microprocessor as claimed in claim 3, wherein:
when the specific order is not satisfied, the microcode controller responds to any of the M complex instructions by the corresponding individual microcode segment stored in the memory.

5. The microprocessor as claimed in claim 1, further comprising:
a detection circuit, detecting whether the M complex instructions in the specific order are respectively received from the first to the M-th entries.

6. The microprocessor as claimed in claim 5, wherein:
when it is detected that the M complex instructions in the specific order are respectively received from the first to the M-th entries, the detection circuit outputs an instruction skip signal to the instruction queue; and
according to the instruction skip signal, second to M-th complex instructions among the M complex instructions are read and removed from second to the M-th entries of the instruction queue.

7. The microprocessor as claimed in claim 6, wherein:
the instruction decoder comprises a complex instruction decoding unit, coupled to the first entry of the instruction queue;
when the M complex instructions in the specific order are respectively received from the first to the M-th entries, the first n microinstructions of the M complex instructions are decoded from the complex instruction decoding unit.

8. The microprocessor as claimed in claim 7, wherein:
the instruction decoder further comprises a trapping generator; and
when it is detected that the M complex instructions in the specific order are respectively received from the first to the M-th entries, the detection circuit outputs a type information signal to instruct the trapping generator to operate the microcode controller and, accordingly, the microcode controller reads the combined microcode segment from the memory.

9. A microprocessor, comprising:
an instruction queue;
an instruction decoder, coupled to the instruction queue; and
a microcode controller, coupled to the instruction decoder, and having a memory, wherein the memory stores a first combined microcode segment corresponding to a first complex instruction and a second complex instruction, and the memory also stores a combined microcode segment for the sequence of the first and second complex instructions;
wherein:
when the first complex instruction and the second complex instruction are respectively received from a first entry and a second entry of the instruction queue, respectively, a first n microinstructions of the first and second complex instructions are decoded by the instruction decoder, and the instruction decoder controls the microcode controller to read remaining microinstructions of the first and second complex instructions from the combined microcode segment of the memory, where n is a number representing a pipeline width.

10. The microprocessor as claimed in claim 9, wherein:
the memory further stores a second combined microcode segment corresponding to the second complex instruction and a third complex instruction,
wherein when the second complex instruction and the third complex instruction are respectively received from the first entry and the second entry of the instruction queue, respectively, first n microinstructions of the second and third complex instructions are decoded by the instruction decoder, and the instruction decoder operates the microcode controller to read the memory for the second combined microcode segment to get the remaining microinstructions of the second and third complex instructions from the second combined microcode segment.

11. The microprocessor as claimed in claim 10, wherein:
the first combined microcode includes a first boundary microinstruction that separates microcode bodies, corresponding to the first complex instruction and second complex instruction, in the first combined microcode segment;
the first boundary microinstruction is provided to deal with an interrupt request happened during execution of microinstructions prior to the first boundary microinstruction;
the second combined microcode segment includes a second boundary microinstruction that separates microcode bodies, corresponding to the second complex instruction and the third complex instruction, in the second combined microcode segment; and
the second boundary microinstruction is provided to deal with an interrupt request happened during execution of microinstructions prior to the second boundary microinstruction.

12. The microprocessor as claimed in claim 10, wherein:
the memory further stores first individual microcode segment, second individual microcode segment, and third individual microcode segment corresponding to the first complex instruction, the second complex instruction, and the third complex instruction, respectively;
when the first complex instruction and the second complex instruction are respectively received from a first entry and a second entry of the instruction queue, the instruction decoder operates the microcode controller to read the memory for the first combined microcode segment rather than reading the first individual microcode segment and the second individual microcode segment; and
when the second complex instruction and the third complex instruction are respectively received from the first entry and the second entry of the instruction queue, the instruction decoder operates the microcode controller to read the memory for the second combined microcode segment rather than reading the second individual microcode segment and the third individual microcode segment.

13. The microprocessor as claimed in claim 12, wherein:
when the first and second complex instructions are not respectively received from the first and the second entries, nor the second and third complex instructions are respectively received from the first and the second entries, the microcode controller reads the first, second or third individual microcode segments in response to the first, second or third complex instruction.

14. The microprocessor as claimed in claim 13, further comprising:
a detection circuit, detecting whether the first complex instruction and the second complex instruction are respectively received from the first entry and the second entry, and detecting whether the second complex instruction and the third complex instruction are respectively received from the first entry and the second entry.

15. The microprocessor as claimed in claim 14, wherein:
when it is detected that the first complex instruction and the second complex instruction are respectively received from the first entry and the second entry, or the second complex instruction and the third complex instruction are respectively received from the first entry and the second entry, the detection circuit outputs an instruction skip signal to the instruction queue to skip pushing a complex instruction, read and removed from the second entry, into the first entry.

16. The microprocessor as claimed in claim 15, wherein:
the instruction decoder comprises a complex instruction decoding unit that is coupled to the first entry;
when the first complex instruction and the second complex instruction are respectively received from the first entry and the second entry, the first n microinstructions of the first complex instruction and the second complex instruction are decoded from the complex instruction decoding unit; and
when the second complex instruction and the third complex instruction are respectively received from the first entry and the second entry, the first n microinstructions of the second complex instruction and the third complex instruction are decoded from the complex instruction decoding unit.

17. The microprocessor as claimed in claim 16, wherein:
the instruction decoder further comprises a trapping generator; and
when it is detected that the first complex instruction and the second complex instruction are respectively received from the first entry and the second entry, the detection circuit outputs a type information signal to instruct the trapping generator to operate the microcode controller and, accordingly, the microcode controller reads the first combined microcode segment from the memory; and
when it is detected that the second complex instruction and the third complex instruction are respectively received from the first entry and the second entry, the detection circuit uses the type information signal to instruct the trapping generator to operate the microcode controller to read the second combined microcode segment from the memory.

18. The microprocessor as claimed in claim 17, wherein:
the first complex instruction is a system call instruction of a system call procedure;
the second complex instruction is a register swapping instruction of the system call procedure;
the third complex instruction is a system return instruction of the system call procedure;
the system call procedure starts in response to the system call instruction and the register swapping instruction which are successively arranged; and the system call procedure ends in response to the register swapping instruction and the system return instruction which are successively arranged.

* * * * *